US006259769B1

(12) United States Patent
Page et al.

(10) Patent No.: US 6,259,769 B1
(45) Date of Patent: Jul. 10, 2001

(54) PORTABLE SMART CARD COMMUNICATION DEVICE

(75) Inventors: Kevin J. Page, Del Mar; Don P. Plum, San Diego; Guy M. Kelly, La Jolla; Joseph V J Ravenis, II, San Diego; David R. Carta, Poway, all of CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 09/305,096

(22) Filed: May 4, 1999

(51) Int. Cl.[7] .................................................. H04M 1/00
(52) U.S. Cl. .............................. 379/58; 235/380; 235/492
(58) Field of Search ............................... 379/58; 235/492, 235/380

(56) References Cited

U.S. PATENT DOCUMENTS

| 5,138,649 | * | 8/1992 | Krisbergh et al. ................ 379/58 |
| 5,522,089 | | 5/1996 | Kikinis et al. . |
| 5,590,197 | | 12/1996 | Chen et al. . |
| 5,606,594 | | 2/1997 | Register et al. . |
| 5,671,374 | | 9/1997 | Postman et al. . |
| 5,699,244 | | 12/1997 | Clark, Jr. et al. . |
| 5,845,282 | | 12/1998 | Alley et al. . |

OTHER PUBLICATIONS

"Proxibus Reader Decoder LDP 400:," *Mifare News*, vol. 7, Issue 7, Article No. 10, Oct. 1, 1997, Philips Electronics N.V.

* cited by examiner

*Primary Examiner*—Harold I. Pitts
(74) *Attorney, Agent, or Firm*—Brown, Martin, Haller & McClain

(57) ABSTRACT

A controller module is releasably received in a cradle portion of a transceiver assembly to form a portable smart card communication device. The transceiver assembly includes a transceiver and a connector to electrically connect the controller module to the transceiver. The controller module establishes a communication link between itself and a smart card by sending and receiving signals and data through the connector. Information is read from the smart card and forwarded to the controller module. Information is transmitted through the transceiver assembly and stored on the smart card. The controller module can easily be removed and used with other transceiver assemblies.

12 Claims, 2 Drawing Sheets

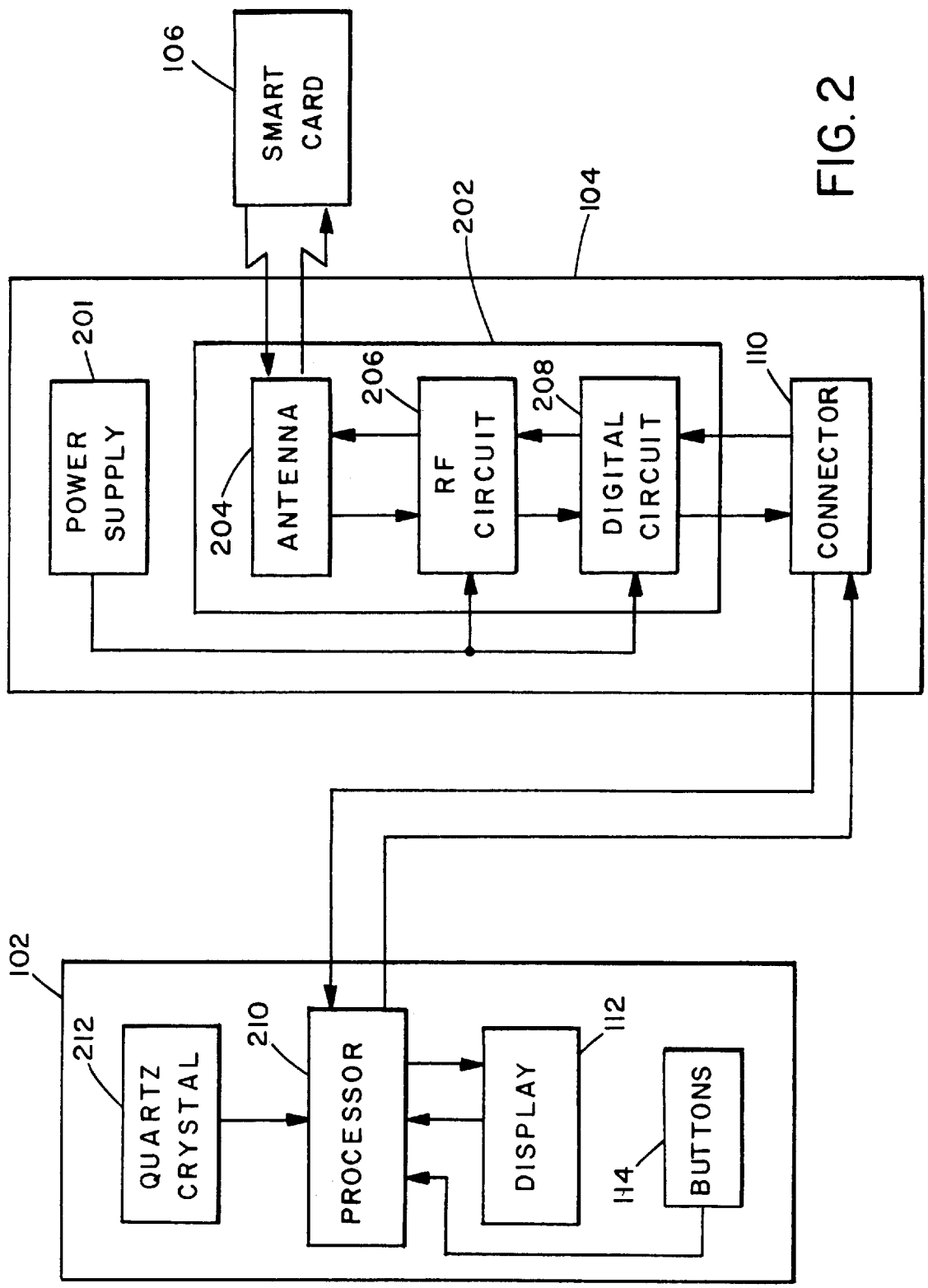

PORTABLE SMART CARD COMMUNICATION DEVICE

BACKGROUND OF THE INVENTION

1. Field of the Invention

The present invention relates generally to smart card systems and more specifically to portable smart card communication devices for writing information to and/or reading information from a smart card.

2. Background

The term "smart card" is typically used to refer to various types of devices having an embedded integrated circuit for storing information. The reference to "smart cards" within this disclosure includes both contact and non-contact cards (also referred to as proximity cards). Smart card communication devices are used to write information to the card and to read information from the card. Some smart card communication devices may only have the ability to read from or write to the smart card. Therefore, a smart card communication device may be a smart card reader, a smart card writer or both.

Typically, the smart card communication device is connected to a host computer that regulates transactions between the smart card and the smart card communication device. In some systems, however, the host computer may be part of the smart card communication device. Smart card systems may include any number of host computers and communication devices depending on the particular configuration and requirements of the system.

The smart card is a small, usually credit card shaped, device that contains at least a memory device for storing information and a transceiver to communicate with a smart card communication device. The smart card communication device communicates through the transceiver on the smart card to access the stored information. The smart card communication device may simply read the information, load the information into the memory device or modify existing data in the memory device. For example, if the owner of a smart card uses a smart card containing financial information to make a purchase, the smart card communication device can read the information including the owner's identity and the availability of funds. The smart card communication device can also deduct the purchase amount from the available funds if it has writing capabilities. Further, the communication device can store transaction data on the smart card including the time and location of the transaction in addition to the identity of the communication device.

Existing smart cards can be classified as either contact or non-contact smart cards. It is not necessary for non-contact smart cards (also referred to as proximity cards) to physically contact a smart card communication device to exchange data. Proximity cards typically employ modulated radio frequency (RF) field and impedance modulation techniques to transfer data between the proximity card and the proximity card communication device.

Smart cards have a variety of uses and can be utilized in any transaction that involves the exchange of data or information between individuals and an institution. For example, smart cards can be used to store information including medical records, financial information, vehicle maintenance information, pet information, and a variety of other information traditionally printed on paper or plastic or stored on cards having a magnetic stripe or an optical bar code. Smart card technology has been particularly useful in banking systems and other financial transaction systems. For example, smart card technology has been used effectively in mass-transit systems where the stored value on a smart card is decreased by an amount equal to the fare each time the passenger uses the card to gain access to or exits from the mass-transit system. As described above, other information may be stored or modified on the card such as the time and location of transaction.

A wide variety of transactions involving smart cards are performed with a fixed smart card communication device in a location providing adequate communication and power resources for fixed systems. Many transactions, however, may require the use of a portable smart card communication device. For example, in mass-transit systems, a portable smart card communication device is useful in ticketing passengers that are seated on the mass-transit vehicle or on the boarding platform. Passengers may be severely inconvenienced by having to purchase tickets or renew their smart cards at a sales office, especially when trying to board a departing train or bus.

As our society becomes increasingly mobile, demands increase for portable products. Smart card users often would like to check the value remaining on their smart cards while traveling. A user, for example, may wish to determine if there are sufficient funds on a smart card for a return trip while traveling to a destination. Further, a smart card user may wish to update the information while in a mobile environment.

Applications that utilize smart cards as an identification cards may require the use of portable communication devices. For example, if a smart card is used as a driver's license, a police officer may need to access the stored information on the smart card while standing next to the driver's vehicle on a roadway. The driver's license in these applications may include data such as insurance carrier information, vehicle registration information, and past violations in addition to standard information included on a driver's license such as a description of the driver.

Existing portable smart card communication devices have several drawbacks. In one existing portable design, a laptop computer is connected to a smart card transceiver. The different parts of the portable smart card communication device are connected by cables making the smart card communication device cumbersome and difficult to use.

Other conventional portable smart card communication devices are constructed as fully integrated single units. These conventional designs are limited in that the user does not have flexibility in choosing specific features of the device such as the type or size of the display or the style of the keyboard. The processing power of the device may be inadequate for the particular purpose of the smart card user or the user may be forced to pay for processing power that is not needed.

In addition to the use of smart cards, the increased power and reduced size of personal computers has accelerated society's trend to a mobile environment. One type of personal computer that is gaining in popularity is referred to as a personal digital assistant (PDA). PDAs are used for a wide variety of applications. For example, PDAs have been used as personal organizers to store information such as schedules, addresses, and phone numbers. In addition, many PDAs can be used as word processors, calculators or to provide other computer functions. Some PDAs provide communication capabilities and can be used to excess the Internet, establish facsimile transmissions, or provide paging or electronic mail services.

PDA designs incorporate a number of improvements over traditional laptop computers in order to facilitate the portability of the devices. PDAs typically incorporate innovations directed at methods of entering information into the PDA and displaying information to the user. For example, many PDAs have touch sensitive screens that allow a user to quickly and efficiently enter information by touching a stylus to the screen. The PDAs may employ a user friendly graphical user interface such as a Windows™ or Windows™ CE interface. In addition, the user may write messages directly on the screen using the stylus. The image produced may be transmitted via electronic mail or facsimile or may simply be stored in memory. With the advances in handwriting recognition, the PDA can interpret the writing and convert it into a text format. Further, the displays used on PDAs are designed to minimize glare from various angles while providing clear images with a minimum of power consumption. These types of screens can be extremely useful where the user is located in an area where it is difficult to use a keyboard or may want to quickly navigate through a menu of files.

Various types of input/output devices have been used to transfer information involving existing data on external media to the PDA. For example, optical scanners, memory cards such as PCMCIA cards, infrared transceivers, cables and some telecommunication techniques have been used to transfer information between the PDA and other sources. These various techniques allow the user to easily transfer data to and from the PDA in a mobile environment.

Many PDAs are linked to Global Positioning Satellite (GPS) systems allowing the PDA to provide the user with a geographical location. Further, the PDA can provide information such as traveling directions if the PDA contains street information such as an electronic map.

Although smart card and PDA technologies are advancing, conventional designs do not provide the benefits of both technologies in a single integrated package. A mobile user wishing to use a portable smart card communication device and a PDA must purchase two separate devices. Further, conventional devices do not provide a method of transferring, viewing or modifying smart card information using a PDA.

Therefore, there exists a need for a portable smart card communication device that provides the user with the flexibility to choose particular features and functions while increasing the convenience to the user and reducing the costs of manufacturing the portable smart card communication device.

SUMMARY OF THE INVENTION

In an embodiment of the invention, a cradle portion of a transceiver assembly receives a controller module to form a portable smart card reader. A transceiver, located in a housing of the transceiver assembly, is connected to the control module through an electrical connector mounted in the housing. The controller module establishes a communication link through the transceiver with a smart card by sending and receiving signals through the connector and controlling operation of the transceiver. The controller module can be easily removed from the cradle portion of the transceiver assembly.

One advantage of the invention is that the user has the flexibility to choose the type of display, the speed and power of the processor, the size of memory or other features or functions typically not directed to the transceiver. The transceiver assembly is chosen to operate within the particular smart card system. Once the appropriate transceiver is determined, the user can choose one of several different types of controller modules that can be received by the transceiver assembly.

Another advantage of the invention is that manufacturing costs are reduced for the portable smart card communication device since the manufacturer can take advantage of economies of scale savings by using a controller module that has other uses in addition to its smart card utility. For example, if the controller module is a standard PDA, the manufacturer can take advantage of the large number of sales of PDAs that reduce the cost of the controller module. The manufacturer can reduce costs by avoiding the design and manufacture of standard PDA components such display screens, memory devices and processors.

Another advantage of the invention is that the user can purchase a single device that functions as a portable smart card communication device and a PDA. Further, if the user owns a PDA, the user can purchase the transceiver assembly that will interface to the PDA and is not forced to purchase many of the expensive components found in the PDA in order to obtain a portable smart card communication device.

Still another advantage of the invention is that, if the controller module is a PDA, the user can use the features of the PDA in conjunction with the smart card communication device. Information can be easily transferred between the PDA and a smart card. The user can check the value of the smart card through the PDA. If the PDA has telecommunication connection capability such as Cellular Digital Packet Data (CDPD) link, the user may be able to add value to the smart card. The user may use the user friendly input and output methods such as the touch screen to view information on the smart card and enter data into the smart card.

Yet another advantage of the invention is that a smart card can be produced to include various types of preprogramed information that can be utilized by the PDA. For example, a smart card may be programmed to include street information regarding a particular geographical area. A user may purchase the smart card in anticipation of traveling to the area and transfer the information into the portable smart card communication device. The controller module (PDA) can use the information on the smart card in conjunction with GPS information to provide the user with traveling directions to a particular destination with the geographical area.

Also, the invention allows the information and data that is extracted from the smart card to be transferred to a host computer without the need to modify or load software on the host computer. Therefore, information and data can easily be transferred from a smart card to a host computer such a PC without the need for a specialized equipment or software.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which:

FIG. 2 is block diagram of a portable smart card system in accordance with a preferred embodiment of the invention.

DESCRIPTION OF THE PREFERRED EMBODIMENT

Figure 1:
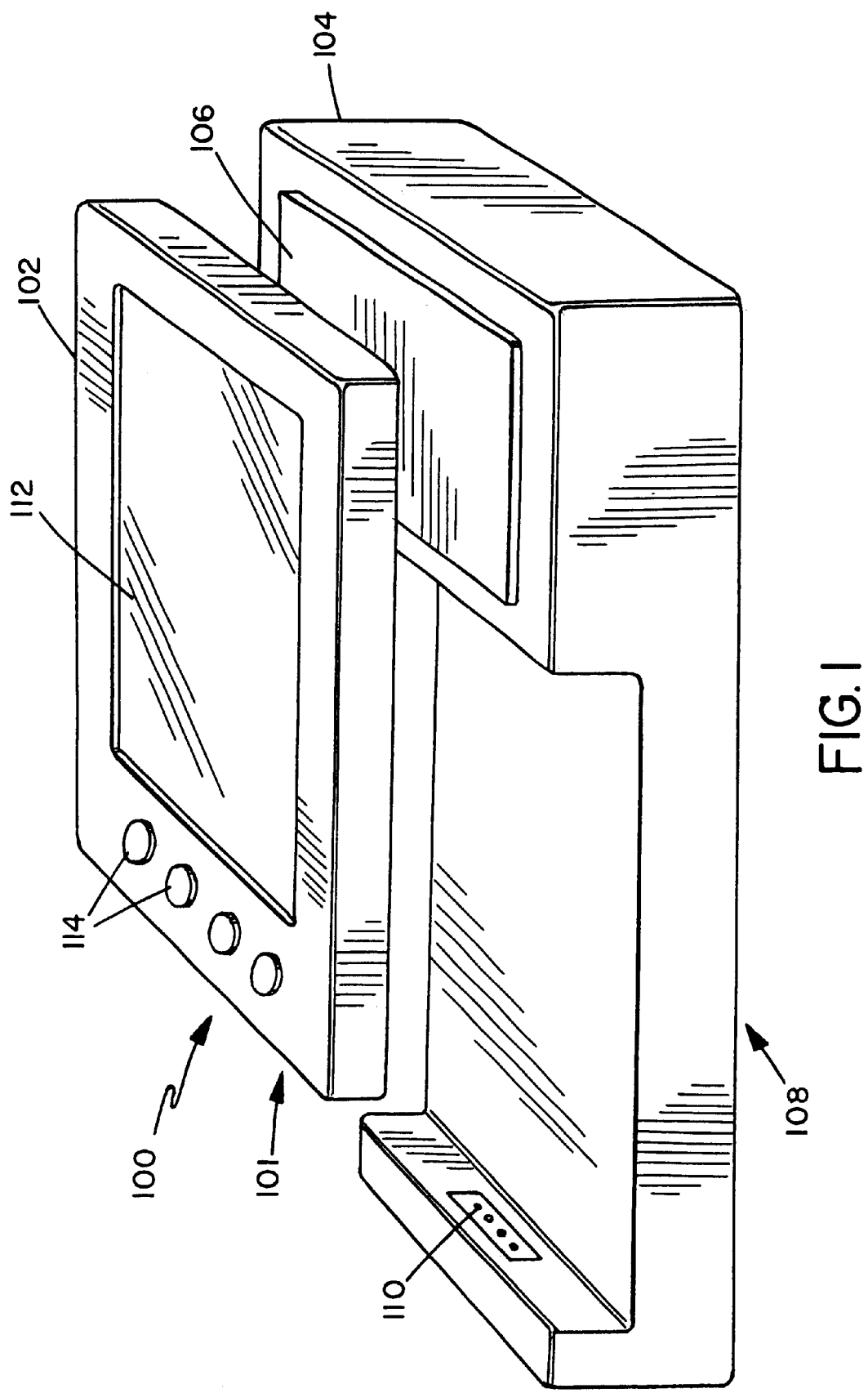
FIG. 1 is isometric representation of a smart card communication device in accordance with a preferred embodiment of the invention.

A smart card communication device in accordance with the preferred embodiment is shown in FIG. 1. The smart card system 100 includes a controller module 102, a transceiver assembly 104, and a smart card 106. The controller module 102 and the transceiver assembly 104 form a portable smart card communication device 101. A cradle portion 108 of the transceiver assembly 104 is adapted to receive the controller module 102. The transceiver assembly 104 includes a transceiver electrically coupled through a connector 110 to the controller module 102 when the controller module 102 is seated in the cradle portion 108.

In the preferred embodiment, the controller module 102 is a personal digital assistant (PDA) such as a PalmPilot™ manufactured by 3Com Corporation (Santa Clara, Calif.). Preferably, the controller module has a touch sensitive display 112 and several bottons 114 that allow the user to enter and view data.

Using known techniques, the transceiver assembly 104 is constructed to allow the controller module 102 to securely "snap" into place when properly aligned with the transceiver assembly 104. When the controller module is securely mounted within the transceiver assembly 104, the connector 110 contacts a mating connector (not shown) on the controller module 102. The connector is, preferably, a Pilot Docking Connector available from 3Com. The connection between the controller module 102 and the transceiver assembly 104 preferably utilizes a protocol consistent with a RS-232 protocol standard. In the preferred embodiment, the protocol is in accordance with the description within International Application Number PCT/US92/08892, titled "Non-contact Automatic Fare Collection System", filed Oct. 19, 1992, and published May 13, 1993 as WO93/09516. Any suitable method, however, of providing electrical connections between the controller module 102 and the transceiver assembly 104 may be used.

A detailed description of a system in accordance with the preferred embodiment is disclosed in the above-referenced PCT publication which is assigned to the assignee of the present invention and is incorporated by reference herein. However, a brief overview of the preferred proximity card system 100 is provided below.

A block diagram of the smart card system 100 in accordance with the preferred embodiment of the invention is shown in FIG. 2. In the preferred embodiment, the smart card system 100 is a non-contact smart card system (also commonly referred to as a contact-less or proximity card system). Any one of several known communication techniques involving smart cards, however, can be used.

Referring still to FIG. 2, the transceiver assembly 104 includes the connector 110, a power supply 201, and a transceiver 202. The power supply 201 includes a battery and voltage regulatory circuits designed using known techniques to supply the components of the transceiver 202 with the appropriate voltage and current for operation.

The transceiver 202 includes an antenna 204, a radio frequency (RF) circuit 206, and a digital circuit 208. In the preferred embodiment, the portable smart card communication device 101 is a smart card reader and writer. Therefore, the transceiver 202 can transmit signals as well as receive signals from the smart card 106. As described in detail in the above referenced PCT publication, the antenna 204 emits a continuous RF field designed to evoke a response from the smart card 106 that is located in the general proximity of the portable smart card communication device 101. Once the smart card 106 is in range, it is powered by the transceiver's 202 RF transmission that is broadcast through the antenna 204. The smart card 106 transmits a message to the transceiver 202 by modulating the RF field. The change in the RF field is detected by the transceiver 202 as a change in impedance experienced by the antenna 204.

The digital circuit 208 is designed using known techniques to facilitate communication between the controller module 102 and the transceiver 202 and, preferably, includes a micro-processor. In alternate embodiments, however, the digital circuit 208 comprises digital logic and does not include a microprocessor.

As stated above, the controller module 102 is preferably a personal digital assistant (PDA) such as a PalmPilot™ which is commercially available from 3Com. The controller module 102 includes a processor 210 and a quartz crystal 212 as well as the display 112 and the input buttons 114. The processor 210 has an internal clock (not shown) whose frequency is determined by the quartz crystal 212. Software, residing on the processor 210, assists in the control of various operations of the controller module 102 and the transceiver 202 including the administration of a communications protocol between the portable smart card communication device 101 and the smart card 106.

Messages and data transmitted to the portable smart card communication device 101 from the smart card 106 are received by the RF circuit 206 through the antenna 204. The RF circuit 206 demodulates the data using known techniques. The resulting demodulated signals are forwarded to the digital circuit 208 which sends the signals to the controller module 102 in accordance with the required protocol of the particular controller module 102.

The signals are received at the processor 210 in the controller module 102 through the connector 110. The processor 210 responds to the signals depending on the type of signal and its contents and in accordance with the software. If the response of the processor 210 requires information to be forwarded to the user, the processor 210 displays the appropriate information through the display 112 using known techniques.

Data and command signals are entered by way of the touch screen display 112 or the input buttons 114. The processor 210 responds to the user's commands and data as well as stored data in the processor 210 in accordance with the software. The processor 210 controls the transceiver 202 by sending signals through the connector 110 to the digital circuit 208. Data that is to be transmitted to the smart card 106 is also sent to the digital circuit 208 through the connector 110. The digital circuit 208 forwards the appropriate signals to RF circuit 206 for transmission. The RF circuit 206, using known techniques, modulates the RF field with the data to transmit the data to the smart card 106.

The controller module 102 may be used with other transceiver assemblies 104. This may be particularly useful if either the controller module 102 or the transceiver assembly 104 is inoperable. Further, a variety of controller modules 102 may be used with the same transceiver assembly 104 if a standard interface is utilized. The controller module 102 may be chosen in accordance with a particular application. For example, a controller module 102 having a powerful processor 210 may be used in an application demanding high processing power while a smaller and lighter controller module 102 may substituted for applications that are not as demanding a processor 210. Controller modules 102 having large touch screen displays 112 may be used in transactions requiring numerous user interactions and may be replaced with controller module 102 having small displays 112 for other applications.

Other embodiments and modifications of the present invention will occur readily to those of ordinary skill in the art in view of these teachings. Such persons will appreciate the symmetries among the various embodiments illustrated above and understand that their elements may be arranged in other ways to produce similar results. For example, other types of PDAs can be used without departing from the scope of the invention. Therefore, this invention is to be limited only by the following claims, which include all such other embodiments and modifications when viewed in conjunction with the above specification and accompanying drawings.

We claim:

1. A smart card transceiver assembly comprising:
   a housing adapted to releasably receive a controller module; and
   a transceiver within the housing adapted to establish a communication link between a smart card and the controller module.

2. A smart card transceiver assembly in accordance with claim 1, the transceiver adapted to receive control signals from the controller module.

3. A smart card transceiver assembly in accordance with claim 2, the transceiver responsive to the control signals by establishing the communication link.

4. A smart card transceiver assembly in accordance with claim 1, further comprising a connector mounted on the housing and electrically connected to the transceiver, the connector adapted to convey signals between the transceiver and the controller module when the housing receives the controller module.

5. A smart card transceiver assembly in accordance with claim 1, wherein the housing comprises a cradle portion adapted to secure the controller module to the smart card transceiver assembly when the housing receives the controller module.

6. A smart card transceiver assembly in accordance with claim 5, wherein the housing further comprises a transceiver area adapted to enclose the transceiver.

7. A smart card transceiver assembly in accordance with claim 1, wherein the transceiver comprises:
   an antenna,
   a receiver, and
   a transmitter.

8. A smart card transceiver assembly in accordance with claim 6, wherein the transceiver is adapted to communicate with the smart card using radio frequency signals.

9. A smart card transceiver assembly in accordance with claim 1, wherein the controller module is a personal digital assistant.

10. A proximity card transceiver assembly comprising:
    a housing having a cradle portion adapted for receiving a personal digital assistant;
    a connector mounted on the housing and adapted to interface to the personal digital assistant; and
    a transceiver inside the housing electrically connected to the personal data assistant through the connector, wherein the transceiver is adapted to respond to control signals sent from the personal digital assistant by establishing a communication link between the personal data assistant and a proximity card.

11. A proximity card transceiver in accordance with claim 10, wherein the housing comprises a latch to secure the personal digital assistant within the cradle portion of the housing.

12. A portable proximity card system comprising:
    a housing having a cradle portion adapted for receiving a personal digital assistant;
    a connector mounted on the housing and adapted to interface to the personal digital assistant;
    a transceiver inside the housing electrically connected to the personal data assistant through the connector; and
    a proximity card adapted to communicate using a protocol;
    wherein the transceiver is adapted to respond to control signals sent from the personal digital assistant by establishing a communication link between the personal data assistant and a proximity card using the protocol.

* * * * *

UNITED STATES PATENT AND TRADEMARK OFFICE
CERTIFICATE OF CORRECTION

PATENT NO. : 6,259,769 B1  Page 1 of 1
DATED : July 10, 2001
INVENTOR(S) : Page, Kevin J.

It is certified that error appears in the above-identified patent and that said Letters Patent is hereby corrected as shown below:

Claim 10,
Line 9, change "personal data" to -- personal digital --.

Claim 12,
Line 7 and 11, change "personal data" to -- personal digital --.

Signed and Sealed this

Twelfth Day of March, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.   : 6,259,769 B1
DATED        : July 10, 2001
INVENTOR(S)  : Page, Kevin J. et al.

It is certified that error appears in the above-identified patent and that said Letters Patent is hereby corrected as shown below:

<u>Column 8,</u>
Lines 15, 19, 30 and 35 change "personal data assistant" to -- personal digital assistant --.

Signed and Sealed this

Third Day of December, 2002

JAMES E. ROGAN
*Director of the United States Patent and Trademark Office*